Patented Sept. 20, 1938

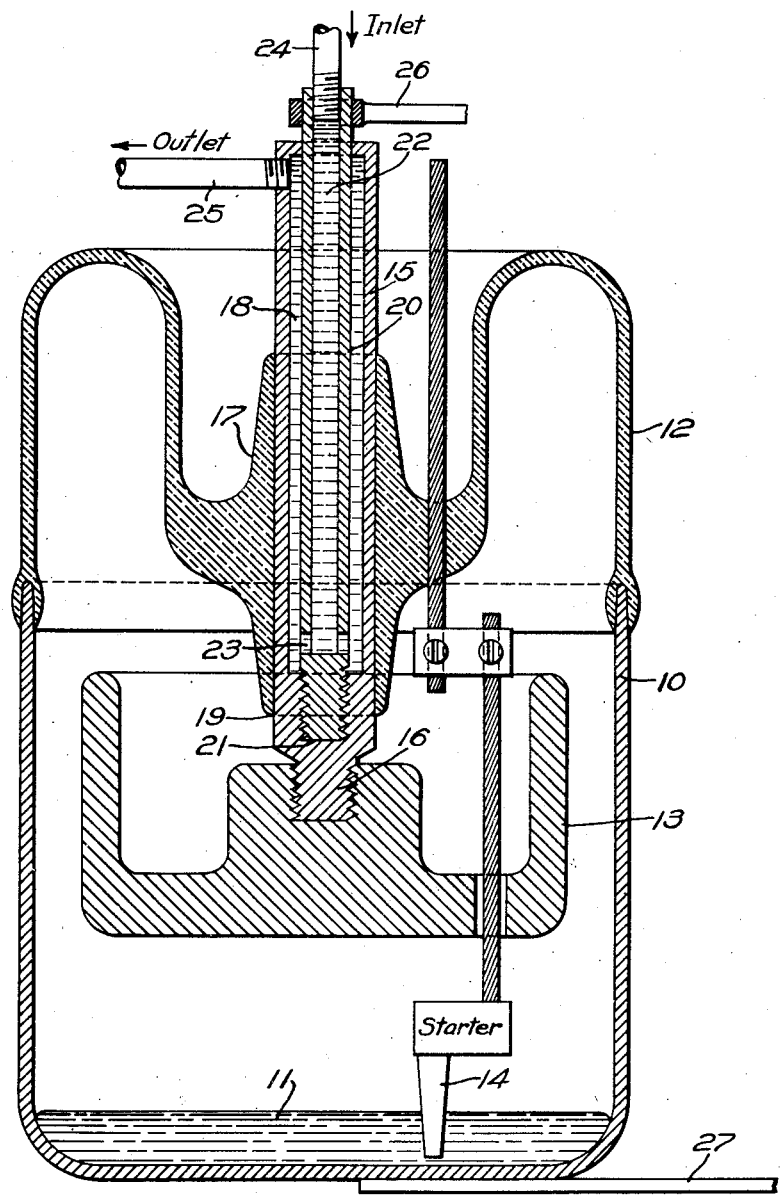

2,130,888

UNITED STATES PATENT OFFICE 2,130,888

IGNITRON SEAL

Donald E. Marshall, Wilkinsburg, Pa., assignor to Westinghouse Electric & Manufacturing Company, East Pittsburgh, Pa., a corporation of Pennsylvania Application February 20, 1936, Serial No. 64,880

8 Claims. (Cl. 250—27.5)

My invention relates to electrical discharge devices and particularly to such devices having a conductor sealed through an insulating portion of the container wall.

An object of my invention is to protect the seal between an insulating and metallic portion of an electrical discharge device from excessive heat.

Another object of my invention is to permit the use of material with good sealing properties although such material may not have good heat conducting properties.

Other objects of my invention will become apparent on reading the following description taken in conjunction with the drawing, in which the figure represents a cross section through an electrical discharge device with certain parts in elevation.

Because my invention is especially useful in its application to electrical discharge devices suitable for welding systems, I have illustrated the application of my invention to such an electron discharge device although the invention is not to be construed as being limited to such a particular device or use of the device.

In electric discharge devices for welding the excessive heating of the electrodes and their connections is quite a problem. This is due to the unusually large root mean square current necessary in this type of service. In one case, in the tube of 40 amperes average the tube has a root mean square value of 250 amperes. Accordingly, it became necessary to provide additional precautions for the heating effect of this excessive root mean square current.

Another problem which I have solved in my invention is that of utilizing effectively a composition of 23% to 34% nickel, 9% to 25% cobalt, less than 1% manganese and the remainder iron or principally iron for use as sealing material in devices in which a large current passes through this material. The material or alloy just mentioned is more particularly described in the copending application of Howard Scott, Serial No. 376,291 for Glass metal seals, filed July 5, 1929. This alloy has the great advantages that it can be sealed vacuum tight to glass and yet will withstand mercury vapor and can be easily machined into any desired shape. This alloy, however, does not have as good a heat conductivity or as low an electrical resistance as copper, for example. Due to the fact that this alloy can be sealed to glass without the special feather edge sealing process necessary with copper, this alloy is much more desirable as a sealing metal for glass. Where a tube, however, is used in which a very high current passes through the metal and where excessive heat is created in the device, then it is advisable to take into account the lower heat conductivity and higher electrical resistance of this excellent glass sealing alloy.

My invention permits the use of this alloy as glass sealing material without danger to the seal from the excessive heat due to the operation of the device or to the high current passing through the alloy.

In the preferred form of the device, the container has a cup-shaped metal portion 10 holding the mercury pool 11. An insulating portion 12 of the container is sealed thereto. The metal of the electrode 10 I prefer to have of an alloy of 23% to 34% nickel, 9% to 25% cobalt, less than 1% manganese and the remainder iron and the insulating portion 12 of a boron silicate glass such as is more particularly described in the copending application of Howard Scott above referred to. An electrical connection 27 for this cathode arrangement can be welded or otherwise connected to the cup 10. Within the container is the anode 13 of iron or carbon and the device also preferably contains the starter 14 with suitable electrical connections thereto. This starter is preferably of the make-alive type having a high refractory material in contact with the mercury pool 11. The make-alive type of starter is more particularly described in the copending application of Joseph Slepian, et al., Serial No. 626,866, for Electric arc devices, filed July 30, 1932. The preferred material for the make-alive is boron carbide.

My invention particularly concerns the conductor for the anode 13 sealed through the insulating portion 12. In the preferred embodiment of my invention, I have preferably a tubular member 15 sealed through the insulating material 12 and supporting the anode 13 on the inner end thereof. While any well known manner of support may be used, I prefer to use an extension 16 on the inner end of the tube screwed into the anode, as disclosed in the drawing. I also prefer to have the insulating portion 12 sealed to the cylindrical sides 17 of the tube 15. This seal, as shown, can extend over quite an area of the cylindrical sides in order to form an extensive and strong seal therewith. The tube 15 has a hollow portion 18 extending preferably below the lower edge 19 of the seal. Extending through this hollow portion 18 is a conductor 20 of high heat conductivity, such as copper or silver, connected at the lowest point 21 to the metal tube, which point is closer to the anode 13 than the beginning of the glass portion of the seal at the point 19. This conductor 20 may be in the form of a solid or stranded conductor or, as shown, may comprise a second tubular member with a hollow portion 22 for cooling means, such as water, to flow therethrough to holes 23 in the lower portion thereof and out through the space 18, thus cooling the walls of the metal tube 15 adjacent the seal on the sides 17. Suitable inlet pipe 24, outlet pipe 25 and electrical connection 26 can be assembled with tubes 15 and 20.

It will be noted that the electrical current will pass through the electrical conductor 20 from the point 21 through the extension 16 of the metal alloy tube 15 to the anode 13 without coming in contact with a section of the seal in its direct path. In other words, the seal 17 is out of the direct path of current flow to the anode. The amount of alloy material between the anode and the inner tip 21 of the copper connection 20 is very small and accordingly the increased resistance due to the higher electrical resistance of the alloy material will be very small.

Of much greater importance is the fact that the flow of heat from the hot anode passing through the alloy metal of the extension 16 will reach the tip 21 of the copper conductor before it reaches the face of the seal 17. The good heat conducting property of the copper conductor will provide an easier path for the flow of this heat to the conduits for the cooling water. The heat will be abstracted from the extension 16 of the alloy material to the copper connection and a dangerous amount will not flow to the seal. The construction of the device will, accordingly, permit the rapid extraction of dangerous heat from the anode and will also provide a cooling means for the seal.

Many modifications are, of course, possible in the specific form, number and arrangement of the elements shown and described. Accordingly, the claims are to be given the broadest interpretation of which their terms are susceptible in view of the limitations imposed by the prior art.

I claim as my invention:

1. An electrical discharge device comprising a casing having an insulating portion, a metal tube, a seal between said insulating portion and said tube, an electrode attached to the inner end of said tube and a metal of high conductivity attached to the said tube at at least two points on opposite sides of said seal.

2. An electrical discharge device comprising a casing having an insulating wall portion, an alloy of 23% to 34% nickel, 9% to 25% cobalt, less than 1% manganese and the remainder iron, a vacuum-tight seal between said alloy and said insulating wall portion, an electrode inside said casing connected to said alloy and an electric and good heat conductor connected to said alloy on the exterior of said casing.

3. An electrical discharge device comprising a casing having an insulating wall portion, a tube of 23% to 34% nickel, 9% to 25% cobalt, less than 1% manganese and the remainder iron, a vacuum-tight seal between the cylindrical sides of said tube and said insulating wall portion, an electrode within said casing supported by said tube, and a conductor exterior to said casing connected to the inner portion of said tube.

4. An electrical discharge device comprising a casing having an insulating portion, a tube of 23% to 34% nickel, 9% to 25% cobalt, less than 1% manganese and the remainder iron, a vacuum-tight seal between the cylindrical sides of said tube and said insulating portion sealed to the cylindrical sides of said tube, an electrode within said casing supported by said tube, and a conductor exterior to said casing connected to the inner portion of said tube and cooling means for said conductor and tube.

5. An electrical discharge device comprising a casing having an insulating portion, a conductor structure, a seal between said conductor structure and said insulating portion, said conductor structure having inner and outer electrical conducting paths past said seal, said inner path being more highly conductive than said outer path in the region of said seal.

6. An electrical discharge device comprising a casing having an insulating portion, a conductor structure, a seal between said conductor structure and said insulating portion, said conductor structure comprising an outer material having substantially the same coefficient of expansion as said insulating portion and an inner material having a greater electrical conductivity than said outer material, both said materials being connected at least on opposite sides of said seal.

7. An electrical discharge device comprising a casing having an insulating portion, a conductor structure, a seal between said conductor structure and said insulating portion, said conductor structure having an outer electrical conducting path of nickel-cobalt-iron alloy and an inner electrical conducting path of copper in the region of said seal.

8. An electrical discharge device comprising a casing having an insulating portion, a conductor structure, a seal between said conductor structure and said insulating portion, said conductor structure comprising an outer tubular portion having substantially the same coefficient of expansion as said insulating portion and an inner hollow core having greater electrical conductivity than said outer portion and of such diameter as to leave a space between the two, both said tubular portion and hollow core being connected to each other water-tight at least on opposite sides of said seal and an inlet and outlet for fluid in said conductor structure outside said seal.

DONALD E. MARSHALL.